(12) United States Patent
Perry et al.

(10) Patent No.: US 7,979,715 B2
(45) Date of Patent: *Jul. 12, 2011

(54) REPLACEABLE PRINT CARTRIDGE

(75) Inventors: Travis J. Perry, Boise, ID (US); Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 765 days.

This patent is subject to a terminal disclaimer.

(21) Appl. No.: 12/024,939

(22) Filed: Feb. 1, 2008

(65) Prior Publication Data

US 2008/0211839 A1 Sep. 4, 2008

Related U.S. Application Data

(63) Continuation of application No. 10/829,644, filed on Apr. 22, 2004.

(51) Int. Cl.
*G06F 21/00* (2006.01)

(52) U.S. Cl. ......... 713/182; 713/168; 713/193; 713/194

(58) Field of Classification Search .................. None
See application file for complete search history.

(56) References Cited

U.S. PATENT DOCUMENTS

| | | |
|---|---|---|
| 4,771,295 A | 9/1988 | Baker et al. |
| 4,961,088 A | 10/1990 | Gilliland et al. |
| 5,146,236 A | 9/1992 | Hirata et al. |
| 5,506,611 A | 4/1996 | Ujita et al. |
| 5,610,635 A | 3/1997 | Murray et al. |
| 5,620,641 A | 4/1997 | Berger |
| 5,642,143 A | 6/1997 | Rhoads |
| 5,798,777 A | 8/1998 | Yoshimura et al. |
| 5,821,967 A | 10/1998 | Solero |
| 5,861,901 A | 1/1999 | Kashimura et al. |
| 5,870,119 A | 2/1999 | Chen et al. |
| 6,109,723 A | 8/2000 | Castle et al. |
| 6,158,837 A | 12/2000 | Hilton et al. |
| 6,196,665 B1 | 3/2001 | Weeks |
| 6,203,139 B1 | 3/2001 | Beauchamp |
| 6,250,735 B1 | 6/2001 | Kaneko et al. |
| 6,250,750 B1 | 6/2001 | Miyazawa et al. |
| 6,270,184 B1 | 8/2001 | Igarashi et al. |
| 6,293,662 B1 | 9/2001 | Shihoh et al. |
| 6,309,045 B1 | 10/2001 | Suzuki et al. |
| RE37,671 E | 4/2002 | Pinkernell et al. |
| 6,378,987 B2 | 4/2002 | Balakrishnan et al. |
| 6,412,911 B1 | 7/2002 | Hilton et al. |
| 6,454,381 B1 | 9/2002 | Olsen et al. |
| 6,460,984 B1 | 10/2002 | Matsumoto et al. |
| 6,471,334 B2 | 10/2002 | Kline et al. |
| 6,474,802 B1 | 11/2002 | Lui |
| 6,481,829 B1 | 11/2002 | Bailey et al. |
| 6,502,917 B1 | 1/2003 | Shinada et al. |
| 6,711,362 B2 * | 3/2004 | Asakura ........................ 399/12 |

(Continued)

FOREIGN PATENT DOCUMENTS

| | | |
|---|---|---|
| EP | 0 720 916 | 7/1996 |
| EP | 0 721 171 | 6/2000 |
| EP | 0 691 207 | 11/2001 |

(Continued)

*Primary Examiner* — Benjamin E Lanier

(57) ABSTRACT

A replaceable print cartridge includes a container and a memory coupled to the container. The memory is configured to limit use of printing material that is to be contained in the container.

20 Claims, 5 Drawing Sheets

U.S. PATENT DOCUMENTS

| | | | |
|---|---|---|---|
| 6,768,877 B2 * | 7/2004 | Alegria et al. | 399/9 |
| 6,775,485 B1 * | 8/2004 | Maurer et al. | 399/9 |
| 2004/0101321 A1 * | 5/2004 | Alegria et al. | 399/24 |
| 2005/0151776 A1 * | 7/2005 | Johnson et al. | 347/19 |
| 2006/0045595 A1 * | 3/2006 | Hanaoka | 400/62 |

FOREIGN PATENT DOCUMENTS

| | | | |
|---|---|---|---|
| EP | 0 789 322 | | 11/2002 |
| JP | 2003122209 A | * | 4/2003 |
| WO | WO 01/32431 | | 5/2001 |

* cited by examiner

REPLACEABLE PRINT CARTRIDGE

CROSS-REFERENCE TO RELATED PATENT APPLICATIONS

The present application is a continuation application claiming priority from co-pending U.S. patent application Ser. No. 10/829,644 filed on Apr. 22, 2004 by Travis J. Parry and Shell S. Simpson and entitled CONSUMABLE RESOURCE ACCESS CONTROL, the full disclosure of which is hereby incorporated by reference.

BACKGROUND

Today's image-forming systems, such as printers and copiers, are commonly used to perform a multitude of different functions in private, commercial and government settings. In particular environments, the cost of operating the image-forming system can be relatively expensive due to the cost of the resources, such as paper, ink or toner, that is consumed. In other environments, specialty inks, toner or paper may be used to print legal documents and negotiable instruments such as checks and the like to prevent easy printing or other duplication of such documents and instruments.

In an attempt to conserve expensive resources such as paper, ink and toner and to prevent the unauthorized printing of legal documents and negotiable instruments, many image-forming systems limit their use to authorized individuals. This is typically achieved by the computer network to which the printer or copier is connected or the printer or copier itself requiring the user to enter a password or some other form of user authorizing identification. Unfortunately, such security measures may frequently be circumvented by the user simply moving the paper, ink or toner to a different printer or copier which does not require user authentication.

DETAILED DESCRIPTION OF EXAMPLE EMBODIMENTS

Figure 1:
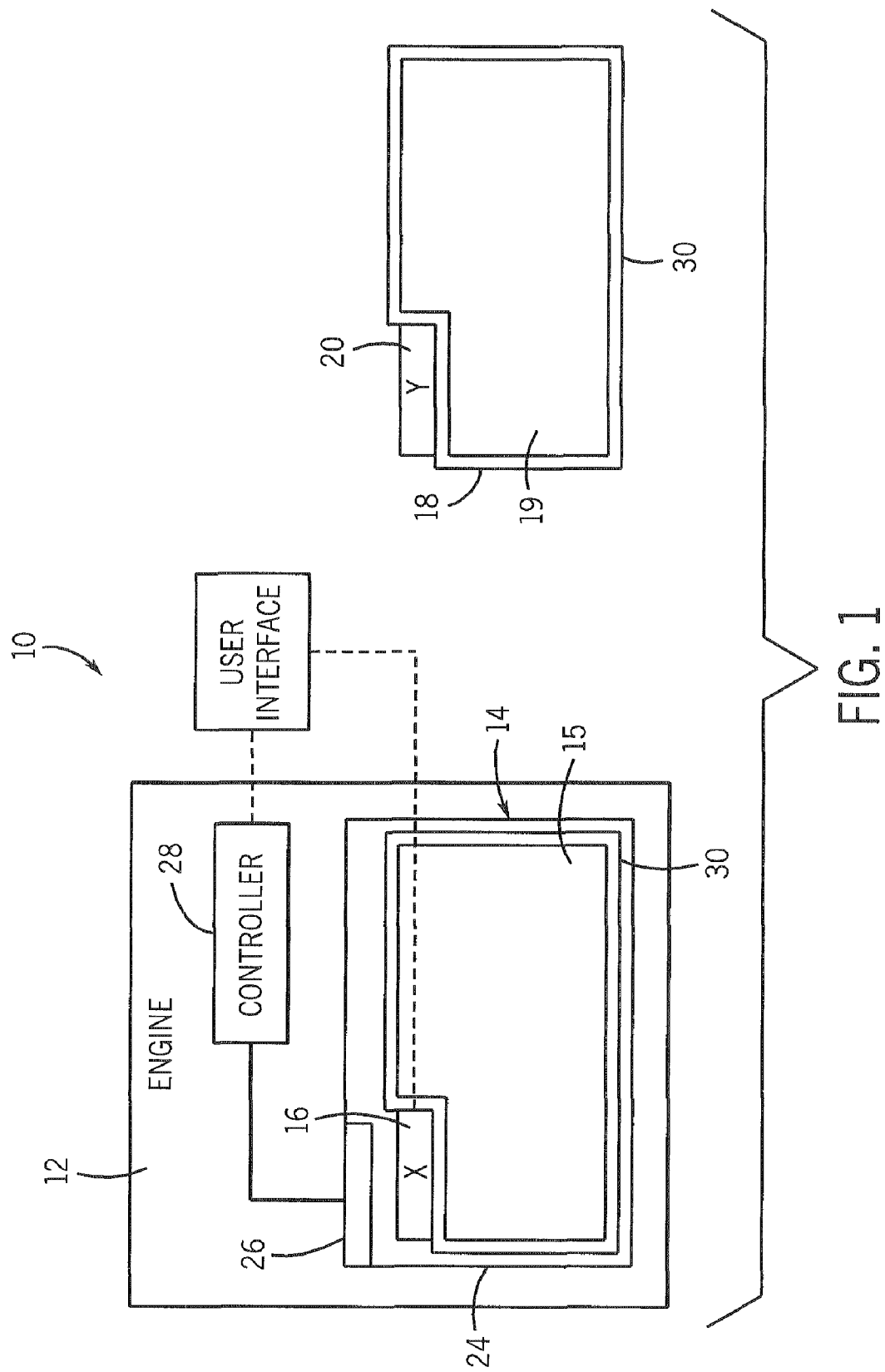
FIG. 1 is a schematic illustration of an image-forming system according to one exemplary embodiment.

FIG. 1 is a schematic illustration of image-forming system 10 configured to interact with an individual or user to print images upon a print medium. System 10 generally includes image-forming device 12, consumable resource access control unit 14 having consumable resource 15 and authorization interface 16, consumable resource access control unit 18 having consumable resource 19 and authorization interface 20, and user interface 22. Image-forming device 12 comprises a device configured to print or otherwise form an image upon a print medium using one of resources 15, 19 and based upon the directions received from a user through user interface 22. In one embodiment, device 12 may be provided as part of an electrophotographic or laser printer which uses a printing material, such as toner, to form an image upon a print medium. In another embodiment, device 12 may be provided as part of an inkjet printer in which device 12 deposits fluid, such as ink, upon a print medium. In still other embodiments, device 12 may be provided as part of other printing devices such as dye-sublimation printers, thermal wax printing systems and thermal autochrome printing systems.

As shown by FIG. 1, device 12 includes resource connection location 24 configured to connect device 12 to one of units 14 and 18. In one embodiment, resource connection location 24 may comprise an external port through which resources are provided to device 12. In another embodiment, location 24 may comprise an internal cavity through which a consumable resource 15 or consumable resource 19 is positioned. In yet another embodiment, location 24 may comprise a dock having a door, enabling resource 15 or 16 to be inserted into the dock and into connection with device 12.

As further shown by FIG. 1, device 12 additionally includes sensor 26 and controller 28. Sensor 26 comprises a device configured to interact with authorization interfaces 16 and 20 so as to transmit signals and information based upon such interaction to controller 28 and/or user interface 22. Sensor 26 is generally positioned along connection location 24 so as to interact with interface 16 and interface 20 when units 14 and 18 are connected to device 12. In particular applications, sensor 26 may be omitted wherein interfaces 18 and 20 directly interact with controller 28 or user interface 22 by wireless transmission of signals.

Controller 28 comprises a processor unit associated with device 12. For purposes of this disclosure, the term "processor unit" shall include a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 28 generates control signals based upon input instructions received from a user through user interface 22. The control signals generated by controller 28 direct those printing elements of device 12 to form images upon a print medium. Controller 28 is further configured to generate control signals to limit use of resource 15 or resource 19 based upon authorization interfaces 16 and 20, respectively. Although controller 28 is illustrated as being physically constructed as part of device 12, controller 28 may alternatively be provided as part of a separate distinct unit or device such as a distinct personal computer which communicates with the printing elements of device 12.

Consumable resource access control unit 14 includes consumable resource 15 and authorization interface 16. Consumable resource 15 comprises a resource that is consumed or worn over time during the formation of images by device 12. According to one exemplary embodiment, consumable resource 15 comprises printing material configured to be deposited upon a print medium. For example, in one embodiment, the printing material may comprise a toner. In another embodiment, the printing material may comprise a fluid such as an ink or liquid wax. In still another embodiment, resource 15 may comprise a print medium upon which the print material is deposited or which includes image-forming material that is selectively activated to form an image. For example, print medium may comprise cellulose-based material, polymeric-based material or a material including mixtures thereof. The medium may have various sizes and shapes. The medium may be in sheet form or roll form.

In still other embodiments, resource 15 may comprise an actual component of device 12 or a printing element of device 12 that wears or is degraded at a rate faster than the remaining components of device 12 such that the component is designed to be replaced or refurbished prior to completion of the life expectancy of device 12. For example, in one embodiment, resource 15 may comprise a photoconductive drum that, in many instances, wears out by abrasion before exhaustion of toner in an electrophotographic type image-forming device. In another embodiment, resource 15 may comprise a consumable power source such as a battery.

Depending upon the particular embodiment, resource 15 may be at least partially housed, contained or bundled. For example, in those embodiments where resource 15 comprises a fluid, such as ink, or a particulate, such as toner, resource 15 may be contained in a container 30, commonly referred to as a cartridge. In other embodiments wherein resource 15 comprises a print medium, resource 15 may be held in a container 30 such as a cartridge or tray. Although housing 30 is illustrated as completely surrounding resource 15, housing 30 may alternatively extend partially about resource 15 such as when resource 15 comprises a print medium, wherein housing 30 may extend about the medium to form a bundle.

Authorization interface 16 is coupled to consumable resource 15 and is configured to interact with user interface 22. For purposes of the disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. In those embodiments in which resource 15 is bundled or contained within housing 30, authorization interface 16 is indirectly coupled to resource 15 at least in part by housing 30. For example, in applications where resource 15 comprises a printing material, such as ink or toner, authorization interface 16 is provided upon housing 30. In another embodiment wherein resource 15 comprises a print medium held in a housing 30 such as a tray, authorization interface 16 may be provided upon the tray. In other embodiments, authorization interface 16 may be directly coupled to resource 15. For example, in one embodiment, resource 15 may comprise a stack of sheets of print medium, wherein authorization interface 16 is formed along one or more side edges of the stack of print medium.

Authorization interface 16 limits use of resource 15 by device 12. In particular, authorization interface 16 communicates with controller 28 such that controller 28 generates control signals to limit use of resource 15. In one embodiment, authorization interface 16 causes controller 28 to generate control signals which only permit authorized users to use resource 16, thereby locking out and preventing any use of resource 15 by non-authorized users. For example, authorization interface 16 may be configured to cause controller 28 to generate control signals which cause an actuator to close off a valve through which resource 15 moves, may actuate a mechanical locking mechanism preventing movement of resource 15 or may interrupt the supply of power to one or more components necessary for device 12 to consume resource 15. Alternatively, authorization interface 16 may be configured to cause controller to generate control signals locking out or preventing unauthorized users from any use of the entire device 12. For purposes of this disclosure, the term "user" refers to both individuals or persons that may request use of a resource such as resource 15 and devices or systems that may request use of a resource such as resource 15.

In still another embodiment, authorization interface 16 may be configured to cause controller 28 to generate control signals which allow varying degrees of access to or use of resource 15. For example, authorization interface 16 may be configured to cause controller 28 to generate control signals that permit a first set of designated persons to use a first percentage of resource 15, to use a first amount of resource 15 or permit the first set of persons to use resource 15 for a first predetermined amount of time while permitting a second set of designated persons to use or to consume a second percentage of resource 15, to consume a second amount of resource 15 or to consume resource 15 for a second predetermined period of time, wherein the second percentage of resource 15, the second amount of resource 15, or the second time differ from the first percentage, the first amount and the first time, respectively. In particular embodiments, authorization interface 16 may be configured to prevent any use of resource 15 or alternatively device 12 by a first set of designated persons, may be configured to permit a first level of use of resource 15 by a second set of designated users and may be configured to permit a second distinct level of use of resource 15 by a third set of designated persons. In lieu of limiting use of resource 15 based upon authorized persons, authorization interface 16 may alternatively be configured to cause controller 28 to generate control signals that limit use of resource 15 for a particular image-forming device 12. For example, authorization interface 16 may be configured to permit the use of resource 15 by only a subset or portion of a total set of image-forming devices which would otherwise be able to utilize resource 15. In particular embodiments, authorization interface 16 may be configured to permit different levels of use of resource 15 by different sets of image-forming devices or printers.

Authorization interface 16 is specifically configured to interact with device 12 such that signals are transmitted to controller 28. This interaction may be achieved by authorization interface 16 interacting with sensor 26 which results in signals being transmitted to controller 28 or may result from authorization interface 16 communicating to controller 28 at least in part through wireless signals. In a first embodiment, authorization interface 16 comprises a memory, such as a digital electronic label, commonly referred to as an e-label, affixed to housing 30. Other forms of memory may alternatively be coupled to housing 30. The memory stores access control data. In such an embodiment, sensor 26 comprises an electronic circuitry configured to read the digital memory and to transmit signals based on the access control data directly to controller 28.

In a second embodiment, authorization interface 16 includes identification marks, such as bar codes, providing access control data. In such an embodiment, sensor 26 comprises a device configured to read the identification marks, such as an optical reader. Sensor 26 transmits signals corresponding to the access control data provided by authorization interface 16 to controller 28. In one embodiment, the identification marks are formed upon housing 30. In another embodiment, the identification marks are directly formed on consumable resource 15. For example, a bar code providing access control data may be directly printed upon or formed along the sides of a ream or stack of print media.

In yet a third embodiment, authorization interface 16 is configured to mechanically interact with sensor 26 to communicate access control data to sensor 26. In particular, authorization interface 16 may include one or more surfaces specifically configured to contact and physically engage one or more corresponding surfaces in sensor 26, wherein sensor 26 transmits signals based upon what surfaces are interacted upon. For example, patterned projections may move, depress or pivot the corresponding surfaces associated with sensor 26. Alternatively, the array or pattern of projections may interact with sensor 26 by blocking one or more optical sensors.

In yet a fourth embodiment, authorization interface 16 may include both memory and a processor 30. Processor 30 is configured to access memory associated with interface 16 and to generate control signals that direct user interface 22 to obtain authorization identification from the individual or the device attempting to use resource 15. In such an embodiment, either processor 30 or controller 28 may then analyze and compare the authorization identification to a listing of authorized individuals contained in the memory. Processor 30 may also generate control signals which are transmitted to device 12 to limit use of resource 15 by device 12.

In still other embodiments, authorization interface 16 may comprise recorded magnetic data, wherein sensor 26 comprises a device for reading such recorded magnetic data such as a magnetoresistive read head. Alternatively, authorization interface 16 may comprise an armature configured based upon menu control data, wherein sensor 26 includes a transformer which detects the at least one armature characteristic. According to one embodiment, interface 16 may comprise a pin having a length selected based upon authorizations to be provided when resource 15 is provided to device 12 while sensor 26 comprises a linear variance differential transformer (LVDT). The detailed description of such an LVDT and armature arrangement is described in co-pending U.S. patent application Ser. No. 10/459,301, the full disclosure of which is hereby incorporated by reference.

Consumable resource access control unit 18 is configured to be interchangeable with unit 14 and includes consumable resource 19 and authorization interface 20. Consumable resource 19 comprises a resource configured to be consumed or worn by device 12 in forming a printed image. Consumable resource 19 serves the same basic function in an image-forming process as resource 15. For example, in embodiments where resource 15 comprises a printing material, resource 19 also comprises a printing material. In other embodiments where resource 15 comprises a printing medium, resource 19 also comprises a printing medium. In applications where resource 15 comprises a consumable device component, resource 19 also comprises a consumable device component. In one embodiment, resources 15 and 19 may be identical to one another in composition and configuration. In another embodiment, resources 15 and 19 may have one or more differing compositions or configurations. Resources 15 and 19 are both configured to be connected to device 12 by the same connection location 24 such that resources 15 and 19 may be interexchanged.

Authorization interface 20 is substantially identical to authorization interface 16 except that authorization interface 20 is coupled to consumable resource 19 rather than consumable resource 15 and except that interface 20 is configured so as to store or represent a second set of authorization data (identified for reference with "Y") distinct from the first set of authorization data (identified for reference with "X") stored or represented by authorization interface 16. As a result, user interface 22 will indicate one or more additional, fewer or alternative authorized users of resource 19 rather than resource 15. In particular embodiments, authorization interface 20 may be omitted, wherein no authorization limits are imposed as a default when no option interface is coupled to the resource being used by device 12.

User interface 22 generally comprises a device or portion of a device configured to receive authorization input from a person or a system using device 12. For example, in one embodiment, user interface may comprise a keyboard, wherein an individual is prompted to enter his or her name, a code or a proposed use or a password. In another embodiment, user interface 22 may include a microphone wherein the individual attempting to use resource 15 is prompted to speak. In still another embodiment, user interface 22 may comprise a camera or other optical sensing device configured to optically sense identification characteristics of the individual attempting to use resource 15. In still another embodiment, user interface 22 may include a card reader or other similar sensing device configured to sense a card or other identification paraphernalia, wherein user interface 22 prompts the individual to insert or slide the card relative to the reader or to otherwise position the card or other paraphernalia relative to the sensing device of the reader.

In another embodiment, user interface 22 may additionally or alternatively comprise a programmatic interface configured to receive authorization input from an electronic system, such as an automated system. For example, a computer or network system may request use of device 12. In such an application, the system may transmit a signal representing a password, device identification or proposed use to controller 28. Controller 28 (or a processor associated with resource 15) compares the authorization input from the device or system with access control data associated with resource 15 to deny, grant or limit access to resource 15 by the system or device.

In addition to receiving authorization input, user interface 22 may also be configured to display or otherwise indicate grant or denial of authorization or the level or scope of authorization being granted. In one embodiment, user interface 22 may comprise a visual display such as an LCD screen that lists authorized users or devices. In another embodiment, user interface 22 may comprise other visual indicators such as LEDs or other surfaces that light up or change color depending upon the given authorization(s). In still other embodiments, various other mechanisms using other visual indicators, auditory indicators or position indicators may be employed. In particular embodiments, the explicit indication of either a grant or denial of the permission may be omitted, wherein the usage of resource 15 or the denial of use of resource 15 inherently indicates a grant or denial of authorization.

In addition to the aforementioned functions, user interface 22 may perform other functions as well. For example, user interface 22 may communicate malfunctions or errors of device 12. User interface 22 may alternatively be configured to enable a user to submit jobs to device 12 or to release held or stored jobs such as print, copy or incoming fax jobs.

User interface 22 is operably associated with device 12 and resource 15 or resource 19 when such resources are being utilized by device 12. In one embodiment, user interface 22 is directly coupled to device 12 in that user interface 22 is a physical part of the overall unit or structure housing device 12. For example, user interface 22 may comprise an LCD screen built as part of a printing device including device 12. In another embodiment, user interface 22 may be provided as part of a distinct unit or device wired to device 12 or operably coupled to device 12 wirelessly. For example, in one embodiment, user interface 22 comprises a separate monitor, such as a person's desktop, operably coupled to a distinct image-forming device incorporating device 12.

FIG. 1 illustrates the use of image-forming system 10. When a user connects resource 15 to device 12, authorization interface 16 transmits access control data by its interaction with sensor 26, by direct communication with interface 22 or by wireless communication with controller 28. In other embodiments, transmission of access control data by authorization interface 16 may occur at other times. For example, authorization interface 16 may not automatically transmit access control data upon connection to device 12, but may alternatively transmit access control data upon the user requesting a print job through interaction with user interface 22.

Based upon the first access control data from resource 15, controller 28 generates control signals causing user interface 22 to indicate a first group of authorized users or devices that may use resource 15. In such embodiments, the person requesting authorization or the person attempting to use resource 15 on the particular device 12 is expected to voluntarily terminate the use of resource 15 or to limit his or her use of resource 15 in accordance with the authorization indicated by user interface 22.

In another embodiment, controller 28 additionally generates control signals causing user interface 22 to automatically obtain authorization identification from the individual or the device attempting to use resource 15 or to prompt the individual or device to input such authorization identification, such as a password, personal identification number, project, client or matter identification code or number and the like. For example, interface 22 then either prompts user to enter authorization identification by an input mechanism such as a keyboard, microphone or a reader optical device or the like, or automatically senses identification or authorization identification. Based on such authorization input, controller 28 generates control signals preventing the person attempting to use resource 15 from using resource 15 beyond the scope of granted authorization. In particular applications, controller 28 may additionally generate control signals which cause user interface 22 to display or otherwise indicate the grant, denial or scope of authorization given. In still other embodiments, such explicit indication of the grant, denial or scope of authorization given may be omitted. Image-forming system functions similar when resource 19 is connected to device 12.

Overall, image-forming system 10 provides reliable control over the use of consumable resources. In particular, authorization interfaces 16, 20 restrict the use of resources 15, 19 to only those individuals or devices (collectively referred to as "users") which have been given access or authorization, regardless of what actual device 12 is consuming the resources 15, 19. In particular embodiments, different individuals or different devices may be provided with limited access to or use of resources 15, 19 based upon authorization interfaces 16, 20. For example, a particular subset of total users may be given authorization to only use a certain quantity of the resource over a predetermined period of time, to use the resource only on a subset of available devices 12 or to use resources 15, 19 for only a predetermined period of time.

Figure 2:
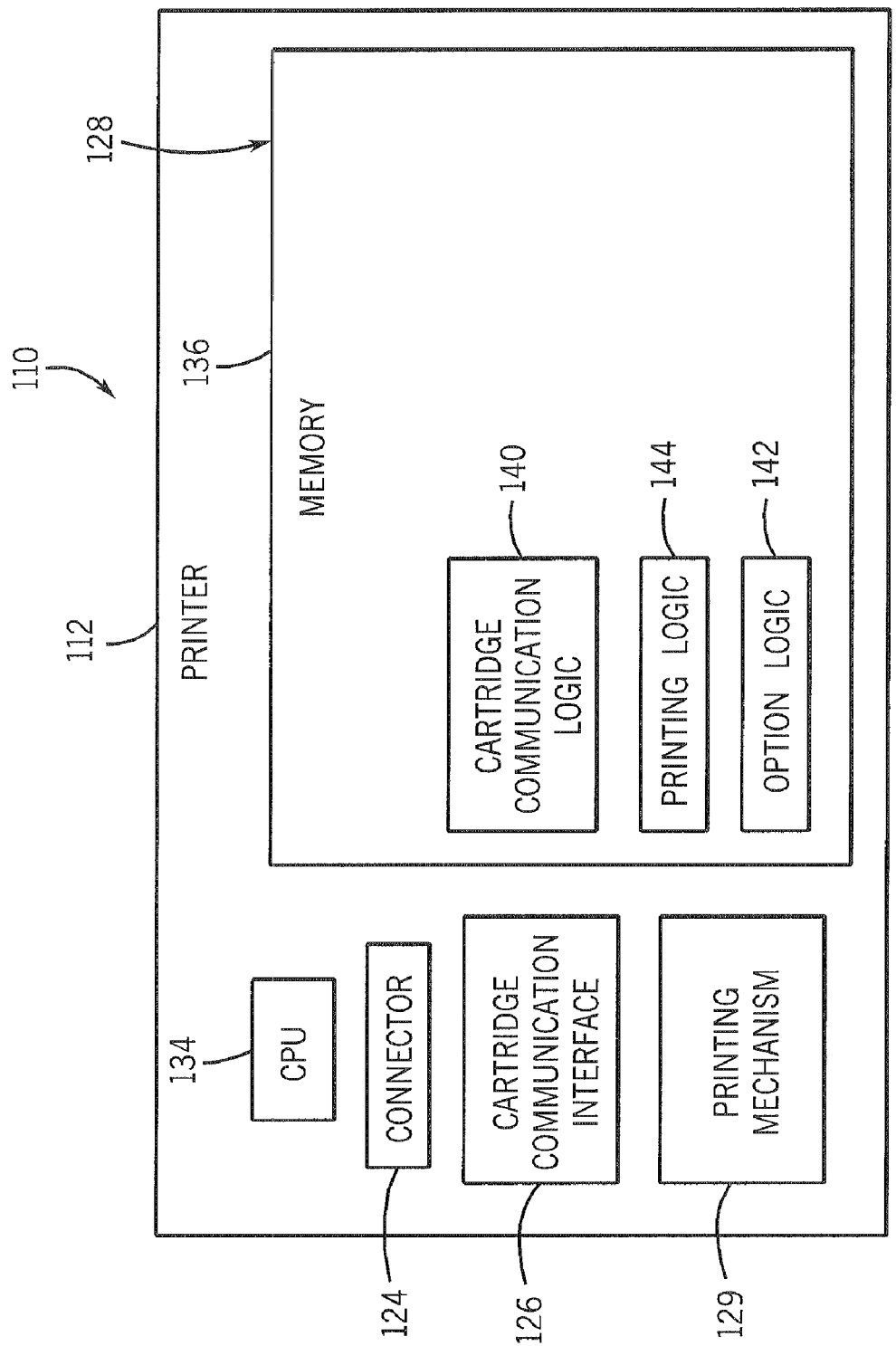
FIG. 2 is a schematic illustration of one example of an image-forming device of the system of FIG. 1.
Figure 3:
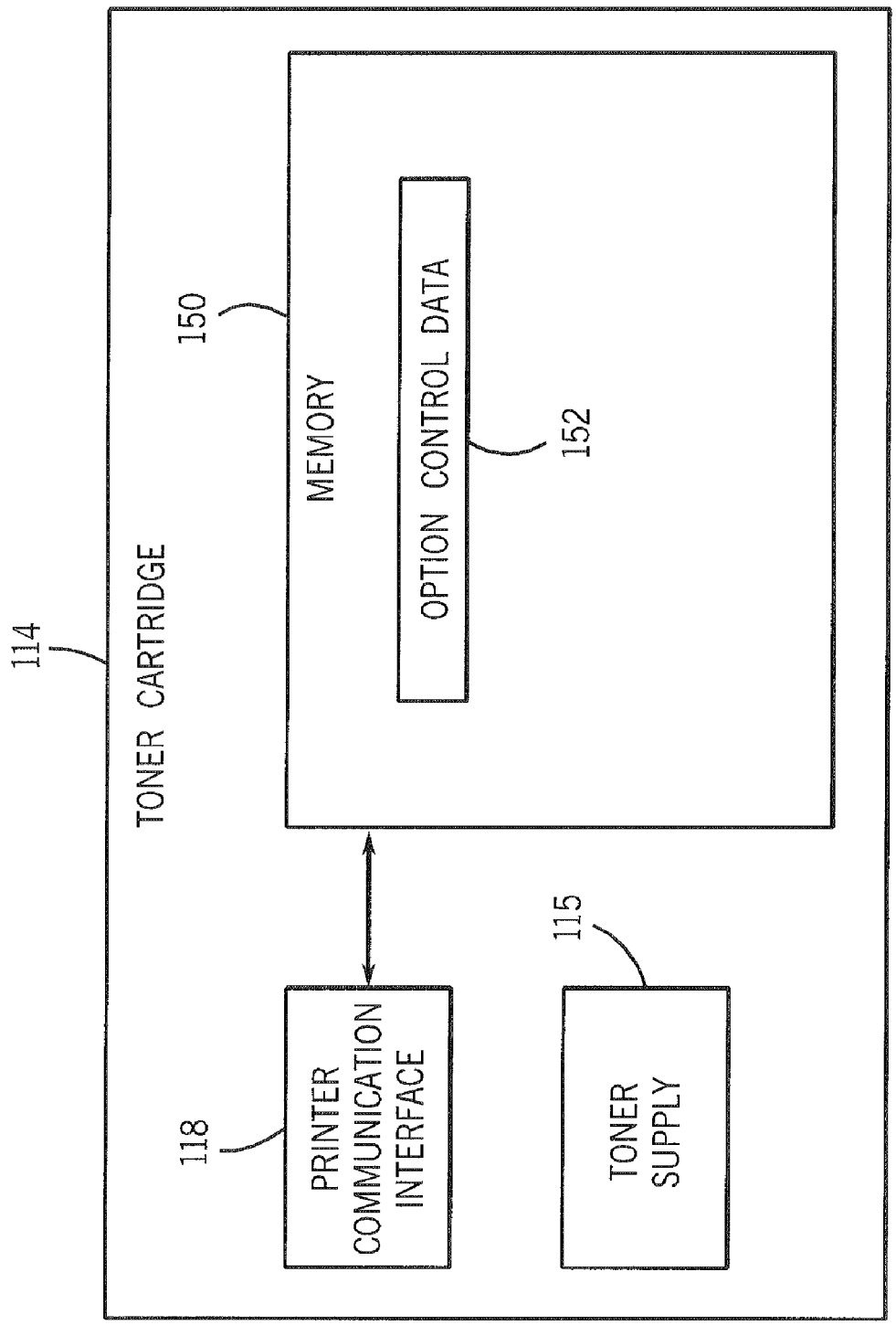
FIG. 3 is a schematic illustration of one example of a consumable resource access control unit of the system of FIG. 1.

FIGS. 2 and 3 schematically illustrate image-forming system 110, one particular example embodiment of image-forming system 10. Image-forming system 110 includes image-forming device 112 (shown in FIG. 2), resource and access control unit 114 (shown in FIG. 3) and user interface 22 (shown and described above with respect to FIG. 1). Image-forming device 112 comprises a printer configured to print an image upon a medium. Image-forming device 112 includes connector 124, communications interface 126, controller 128 and printing mechanism 129. Connector 124 is substantially identical to connector 24 described above with respect to FIG. 1. Connector 124 comprises one or more structures configured to facilitate the connection of resource and access control unit 114 to image-forming device 112. In the particular embodiment shown in FIG. 2, connector 124 is configured to enable the consumable resource 115 to be transmitted and consumed by printing mechanism 129.

Communications interface 126 comprises a device configured to interface with resource and access control unit 114 to enable the receipt of access control data.

Controller 128 directs the operation of printing mechanism 129. Controller 128 includes processor unit 134 and a memory 136. Processor 134 generates control signals based upon instructions from memory 136 and access control data received through communications interface 126.

Memory 136 comprises one or more structures configured to store or contain data and/or instructions for use by controller 128. Memory 136 may include one or more of programmable read-only memory, non-erasable read-only memory or random access memory. Memory 136 may comprise digital memory in the form of hardwired circuitry or may comprise fixed or portable memory such as optical memory (e.g., CDs, DVDs), magnetically encodable memory (e.g., tape, floppy disk), or other forms. Memory 136 contains logic or instructions, otherwise known as code, which is used by processor 134 to generate control signals. In the particular embodiment shown, memory 136 includes communication logic 140, access logic 142 and printing logic 144. Communication logic 140 comprises processor readable instructions for the generation of control signals to direct the operation of communications interface. In particular, based on logic 140, processor 134 generates control signals that cause communications interface to detect when resource and access control unit 114 is connected to device 112 by a connector 124 and to read access control data from unit 114.

Access logic 142 comprises processor readable instructions that are used by processor 134 to evaluate access control data received from unit 114, to generate control signals that cause user interface 122 to receive authorization input from an individual or device, to evaluate such input, and to grant, deny or limit access to use of the resource based upon the input. Printing logic 144 comprises processor readable instructions that are used by processor 134 to generate control signals that cause printing mechanism 129 to print or otherwise form an image upon the print medium using one or more of the previously indicated authorizations selected by a user.

Printing mechanism 129 comprises a mechanism configured to form an image upon a print medium. In one particular embodiment, printing mechanism 129 comprises an electrophotographic printing mechanism including a photoconductive drum. In another embodiment, printing mechanism 129 comprises an ink jet printing mechanism including one or more printheads configured to selectively eject a fluid onto a print medium.

Resource and access control unit 114 supplies consumable resource 115 to printing mechanism 129 and additionally supplies access control data to processor 134. In addition to consumable resource 115 and interface 118, unit 114 includes memory 150. Memory 150 comprises computer readable medium containing access control data 152. Access control data 152 are read by or transmitted to processor 134 through interface 118. In one particular embodiment, option interface 114 includes a secondary processor (not shown) which reads access control data 152 and transmits the data to processor 134. In another embodiment, interface 114 includes a secondary processor (not shown) and access control logic 152, wherein the secondary processor generates control signals based upon data 152 which are transmitted to user interface 22. In particular applications, a secondary processor provided as part of control unit 114 may be configured to compare access control data 152 with input authorization identification obtained through user interface 22 and to generate control signals which control and possibly limit the user of resource 115.

Consumable resource 115 is a resource that is consumed over time during the formation of images by device 112. According to one exemplary embodiment, consumable resource 115 comprises printing material configured to be deposited upon a print medium. For example, in one embodiment, the printing material may comprise an ink or a toner. In another embodiment, the printing material may comprise a fluid such as an ink or liquid wax. In still another embodiment, resource 115 may comprise a print medium upon which the print material is deposited or which includes image-forming material that is selectively activated to form an image. For example, the print medium may comprise a cellulose-based material, a polymeric-based material or a material including mixtures thereof the interior.

Access control interface (printer communication interface) 118 comprises a device configured to interact or interface with communications interface 126 to facilitate the transmission of signals between unit 114 and device 112. In the particular embodiment shown, interface 118 transmits signals based upon information or data contained in memory 150.

Figure 4:
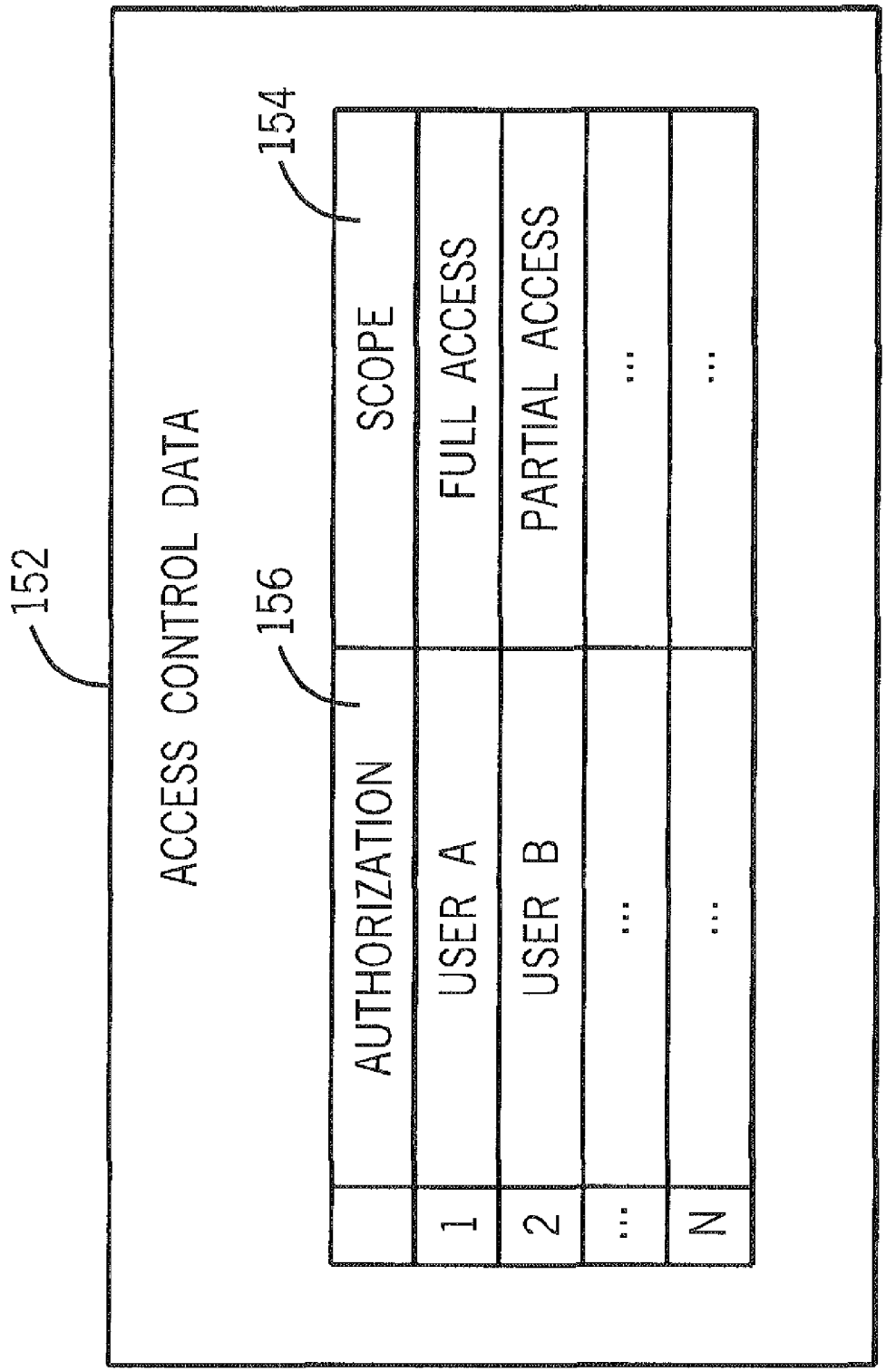
FIG. 4 is a diagram schematically illustrating one example of access control data provided by the unit of FIG. 2.

FIG. 4 illustrates one example of access control data 152. As shown by FIG. 4, data 152 includes authorization information or instructions identifying those individuals who have authorization and who are granted access to use resource 115. Data 152 further includes information identifying the scope of access or authorization being granted to the named individuals. In the particular examples shown in FIG. 4, access control data 152 includes instructions or data which cause controller 128 to grant user A full access to the use of resource 115 while granting user B only partial access to the use of resource 115. For example, user A may have complete rights to use resource 115 for any amount of time on any device and with no limitations on the quantity of resource 115 that may be used. Individual B may be restricted to his or her use of resource 115 in that individual B may only use resource 115 for certain times of a day, for a certain predetermined period of time or on particular machines. User B may also be limited to the quantity of resource 115 that he or she may use in a particular time or over a predetermined period of time. In other embodiments, access control data 152 may include data or information which cause controller 128 to authorize use of resource 115 or which grants access to use of resource 115 to particular devices rather than particular individuals. In still other embodiments, access control data 152 may be configured to cause controller 128 to specifically deny access to or use of resource 115 to particular individuals or particular devices. In particular applications, access control data 152 may be configured so as to have a default setting such as "deny all" or "grant all", wherein access control data 152 may be modified to provide exceptions to the default settings.

Figure 5:
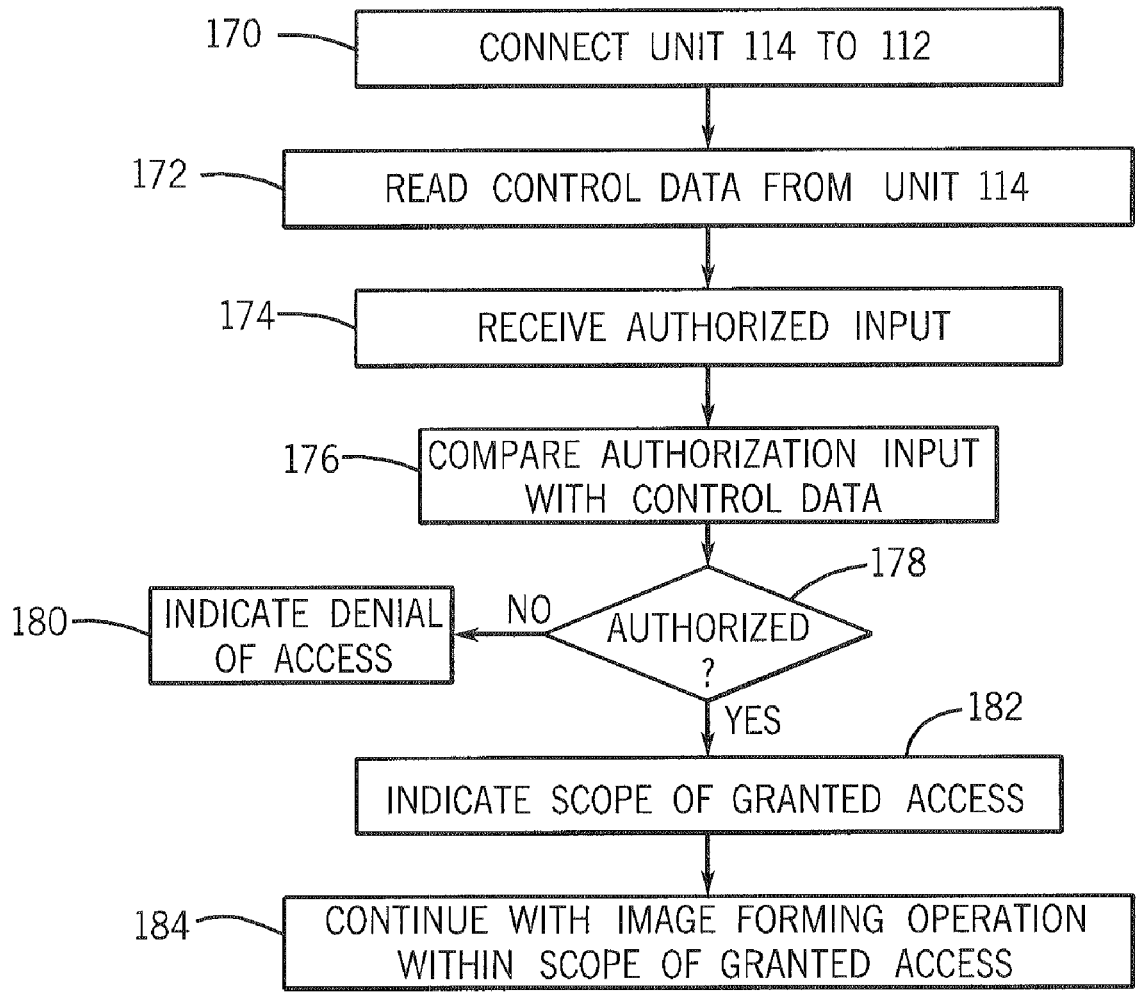
FIG. 5 is a flowchart illustrating logic performed by the device of FIG. 2 when connected to the unit of FIG. 3 according to one exemplary embodiment.

FIG. 5 is a flow chart illustrating the steps performed by device 112 when resource and access control unit 114 is connected to device 112. As indicated by step 170 in FIG. 5, the connection of unit 114 to device 112 is sensed by communication interface 126 (shown in FIG. 2) which transmits signals to processor 134. Processor 134 consults logic 140 of memory 136. As indicated by step 172, based upon the instructions provided by logic 140, processor 134 generates control signals which cause communication interface 126 to read access control data 152 upon memory 150 of unit 114 using option interface 118.

As indicated by step 174, processor 134 further generates control signals causing user interface 22 (shown in FIG. 1) to receive authorization input. In the particular embodiment shown, authorization input is received from an individual attempting to use resource 115. In one embodiment, user interface 22 may comprise a keyboard, wherein an individual is prompted to enter his or her name, a code, a proposed use or a password. In another embodiment, user interface 22 may include a microphone, wherein the individual attempting to use resource 115 is prompted to speak. In still another embodiment, user interface 22 may comprise a camera or other optical sensing device configured to optically sense identification characteristics of the individual attempting to use resource 115. In still another embodiment, user interface 22 may include a card reader or other similar sensing device configured to sense a card or other identification paraphernalia, wherein user interface 22 prompts the individual to insert or slide the card relative to the reader or to otherwise position the card or other paraphernalia relative to the sensing device. In other embodiments, authorization input may be received from another electronic device or system, such as an automated system. In such an application, user interface 22 may comprise an electrical, optical or wireless connection between device 12 and the electronic device or system providing such authorization input. In particular embodiments, access control data from unit 114 may be read after authorization input has been received or while authorization input is being received.

Once authorization input and access control data have been received by processor 134, processor 134 compares the received authorization input with the read access control data as indicated by step 176. As indicated by step 180, processor 134 determines whether the individual is authorized to use resource 115. As indicated by step 180, if processor 134 determines that an individual is not authorized based upon the received authorization input, processor 134 generates control signals which cause user interface 22 to indicate a denial of authorization or access. Such indication may be through auditory signals or a visual display. In other embodiments, processor 134 may simply generate control signals such that the individual is not permitted to use resource 115.

As indicated by step 182, if processor 134 determines that the individual is authorized based upon the received authorization input and the access control data from unit 114, processor 134 further generates control signals which cause user interface 22 to indicate a scope of granted access. In one particular embodiment, user interface 22 may include a monitor which displays the scope of granted access. In another embodiment, user interface 22 may include lights, such as light-emitting diodes, positioned adjacent to various levels of access. In still other embodiments where either full access is granted or no access is granted, user interface 22 may indicate authorization with a single light or sound. Alternatively, user interface 22 may omit a specific indication of authorization grant and simply proceed with the further image-forming operations as indicated by step 184. The continuance of image-forming operations in step 184 may include the request for additional instructions from the authorized individual or may involve the initiation of actual printing such as the movement of print media or the forming of an image upon the media.

According to one particular example, the consumable resource access control unit 114 comprises a toner cartridge containing toner and configured to be inserted into a dock or internal cavity forming connector 124 of device 112. In such an embodiment, interface 126 includes one or more electrical contacts which contact one or more electrical contacts of interface 118 to read access control data 152 stored on memory 150 which comprises digital memory. In the particular example, printing mechanism 129 includes a photoconductive drum which facilitates the deposition of the toner upon a print medium in the form of the image being reproduced.

In accordance with this example, image-forming device 112 is configured to additionally print images alternatively utilizing a second resource and access control unit 114, in the form of a cartridge, identical to the first described unit 114 except that the second unit 114 has access control data 152 which causes processor 134 to grant access to the use of resource 115 to a second group of users distinct from the first group of users authorized by the first access control unit 115.

Overall, image-forming systems 10 and 110 provide greater control over the use and consumption of consumable resources by devices 12 and 112. By coupling authorization information through the consumable resource, systems 10 and 110 prevent unauthorized users from simply finding another device, which does not include security measures, to perform a print job. Moreover, the authorized use of the consumable resource may be customized to permit varying levels of use of the consumable resource by different users. As noted above, the same restrictions may alternatively apply to particular devices rather than particular individuals.

Although the present invention has been described with reference to example embodiments, workers skilled in the art will recognize that changes may be made in form and detail without departing from the spirit and scope of the invention. Those skilled in the art will appreciate that certain of these advantages can be obtained separately through reconfiguring the foregoing structure without departing from the spirit and scope of the present invention. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A replaceable print cartridge comprising:
   a container configured to contain a printing material consumed by an image forming device having a user interface for receiving authorization input from a prospective user;
   a memory that stores data comprising identification of persons or groups of persons and portions of the consumable resource allotted to each person or groups of persons, wherein the stored data and authorization input is used by the image forming device to permit use of a predetermined portion of the resource by the device based upon the stored data.

2. The print cartridge of claim 1, wherein the container is configured to contain an ink.

3. The print cartridge of claim 1, wherein container is configured to contain a toner.

4. The print cartridge of claim 1, wherein the memory comprises a digital memory coupled to the container.

5. The print cartridge of claim 1, wherein the device includes a print cartridge interface having at least one electrically conductive contact and wherein the memory comprises at least electrically conductive contact configured to contact the cartridge interface.

6. The print cartridge of claim 1, wherein the memory is configured to grant and deny use of printing material.

7. The print cartridge of claim 6, wherein the memory is configured to grant varying levels of authorization to use of printing material.

8. The print cartridge of claim 1, wherein the memory is configured to grant varying levels of use of printing material.

9. The print cartridge of claim 1 further comprising a processor is fixedly coupled to the container.

10. The print cartridge of claim 1 including the printing material contained in the container.

11. The print cartridge of claim 1, wherein the stored data and authorization input is used by the image forming device to notify a prospective user of whether the prospective user is authorized to use the replaceable print cartridge.

12. The print cartridge of claim 1 further comprising one or more printheads coupled to the container.

13. A print cartridge comprising:
    a container configured to retain and dispense a printing material;
    an authorization granting interface coupled to the container and configured based upon authorized users of the printing material; and
    a code coupled to the container and configured to be read by an optical scanning device, the code providing authorization data.

14. The print cartridge of claim 13, wherein the printing material is selected from a group including toner and ink.

15. The print cartridge of claim 13 including a memory coupled to the container and in communication with the authorization granting interface, wherein the memory stores authorized user data.

16. The cartridge of claim 13 including a programmable medium coupled to the container and providing the authorization data.

17. The cartridge of claim 14, wherein the authorization granting interface is configured to grant and deny use of the resource.

18. The cartridge of claim 17, wherein the authorization granting interface is configured to grant varying levels of authorization to use of the resource.

19. The cartridge of claim 13, wherein the authorization granting interface is configured to grant varying levels of use of the resource.

20. A print cartridge comprising:
    a container configured to retain and dispense a printing material; and
    an authorization granting interface coupled to the container and configured based upon authorized users of the print cartridge, wherein the authorization granting interface is configured to remain coupled to the print cartridge upon withdrawal of the print cartridge from an image forming device, wherein the authorization granting interface identifies a plurality of persons or groups of persons, each of the plurality of persons or groups of persons assigned a different extent of rights to use the printing material.

* * * * *